United States Patent [19]

Worthy

[11] Patent Number: 5,749,043
[45] Date of Patent: May 5, 1998

[54] SYSTEM AND METHOD FOR ESTIMATING CHARACTERISTICS OF BROADCAST RADIO AUDIENCES

[76] Inventor: David G. Worthy, 819 East Vaughn, Gilbert, Ariz. 85234

[21] Appl. No.: 534,508

[22] Filed: Sep. 27, 1995

[51] Int. Cl.[6] .................................................. H04N 7/16
[52] U.S. Cl. ........................................... 455/2; 348/1
[58] Field of Search ................................ 455/2, 3.1, 4.1, 455/4.2, 5.1, 6.1, 6.2, 6.3, 158.4, 158.5, 226.1, 226.4; 348/1, 2, 3, 4, 5, 6, 7, 10, 11, 12, 13; 358/84; 364/571.02; 340/905; 365/571.01; 705/10; H04N 7/16, 7/173

[56] References Cited

U.S. PATENT DOCUMENTS

| | | | |
|---|---|---|---|
| 2,552,585 | 5/1951 | Rahmel | 250/6 |
| 2,896,070 | 7/1959 | Fremont et al. | 250/2 |
| 3,126,513 | 3/1964 | Kamen | 325/31 |
| 3,299,355 | 1/1967 | Jenks et al. | 325/31 |
| 3,434,150 | 3/1969 | Wernlund | 346/1 |
| 3,456,192 | 7/1969 | Mexsell et al. | 325/31 |
| 3,800,223 | 3/1974 | Mead | 325/31 |
| 4,577,220 | 3/1986 | Laxton et al. | 358/84 |
| 4,618,995 | 10/1986 | Kemp | 455/2 |
| 4,732,302 | 3/1988 | Fulmer et al. | 348/1 |
| 4,847,685 | 7/1989 | Gall et al. | 455/2 |
| 4,912,552 | 3/1990 | Allison et al. | 358/84 |
| 5,408,258 | 4/1995 | Kolessar | 348/2 |
| 5,410,724 | 4/1995 | Worthy | 455/2 |
| 5,488,408 | 1/1996 | Maduzia et al. | 348/2 |
| 5,561,835 | 10/1996 | Worthy | 455/2 |
| 5,572,450 | 11/1996 | Worthy | 364/571.02 |
| 5,594,934 | 1/1997 | Lu et al. | 348/1 |

*Primary Examiner*—Christopher C. Grant
*Attorney, Agent, or Firm*—Meschkow & Gresham, P.L.C.; Lowell W. Gresham; Jordan M. Meschkow

[57] ABSTRACT

A system for estimating listening audience characteristics in response to radio broadcast programming includes a central office, a plurality of remote survey sites, and a plurality of remote access sites. The survey sites collect survey data describing radio stations to which vehicle-mounted tuners are tuned. The survey data is downloaded to the central office, where the survey data is associated with a radio program broadcast by a radio station. The survey data and the radio program are presented at the remote access sites in a substantially synchronous format such that audience responses to specific radio programming can be observed.

18 Claims, 4 Drawing Sheets

Fig. 4

SYSTEM AND METHOD FOR ESTIMATING CHARACTERISTICS OF BROADCAST RADIO AUDIENCES

FIELD OF THE INVENTION

The present invention relates generally to survey systems that passively detect radio stations to which radios in passing vehicles are tuned.

BACKGROUND OF THE INVENTION

Most automobiles and other vehicles include radio tuners designed to receive commercially broadcast radio programming. A few audience survey systems utilize electronic RF equipment to passively detect and analyze car radio usage. Radio audience survey systems typically employ an individual testing site that gathers survey data over a predetermined time period. The survey data may identify the most popular radio stations, the estimated number of radio listeners, or audience listening preferences at the particular testing site. This testing site may be moved from time to time to gather survey data for other sites during other time periods. The raw survey data is typically compiled and transformed into readable radio station ratings reports, tables, or charts.

Unfortunately, conventional radio audience survey systems may be inadequate for certain applications. For example, current systems that are limited to sequentially collecting survey data at different locations within a city may be unable to adequately estimate radio station preferences for a large geographical region. Generally, conventional test site equipment and operation is rather expensive. Calibration, data collection, and data retrieval procedures typically must be performed at each individual testing site with a certain amount of human interaction. These conventional procedures make survey data obtained at one site and time incompatible with other survey data taken at another site and time.

The statistical accuracy of RF survey systems is partially dependent upon the number of RF signals detected (i.e., a greater amount of data leads to greater statistical accuracy). The amount of data collected by a passive system may be dependent upon the speed of the vehicles as they pass a testing site, the scanning speed of the electronic equipment, or the number of test sites located within the desired geographical area during a survey period. Due to a limited ability to collect survey data in a cost efficient manner, known survey systems may only be capable of estimating radio audience preferences on an hourly or daily basis. Thus, conventional RF survey systems may be inadequate if survey data is desired over shorter time periods, i.e., a few minutes or less. An improved time resolution is needed when information describing listener responses to short programs, commercials, and/or songs is desired.

Conventional radio audience survey systems provide statistical reports for radio programming broadcast in the distant past. These reports are often made available weeks, or even months, after the radio programming has aired. The reports typically provide little or no information describing what was broadcast by different radio stations during the time period when the survey data was collected. Thus, radio station managers, advertisers, and music industry representatives are provided with no direct listening audience feedback in response to specific radio programming.

SUMMARY OF THE INVENTION

Accordingly, it is an advantage of the present invention that an improved system and method for estimating characteristics of broadcast radio audiences is provided.

Another advantage of the present invention is that a large quantity of survey data based upon vehicle radio usage may be collected in large or small geographical areas.

Another advantage is that a system according to the present invention is capable of collecting a large amount of survey data without utilizing an impractical amount of human labor.

A further advantage of the present invention is that it provides a passive radio survey system capable of detecting radio audience preferences over relatively short time intervals.

Another advantage is that the present invention provides radio survey data associated with radio programming broadcast during the time period that the survey data is collected.

An additional advantage of the present invention is that radio survey results are made available shortly after the surveyed time period.

The above and other advantages of the present invention are carried out in one form by a method for estimating listening audience preferences in response to radio broadcast programming. The method involves monitoring a radio program broadcast by a radio station during a time period, collecting survey data describing radio stations to which tuners are tuned during the time period, and associating the radio program with the survey data in a substantially synchronous format.

BRIEF DESCRIPTION OF THE FIGURES

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
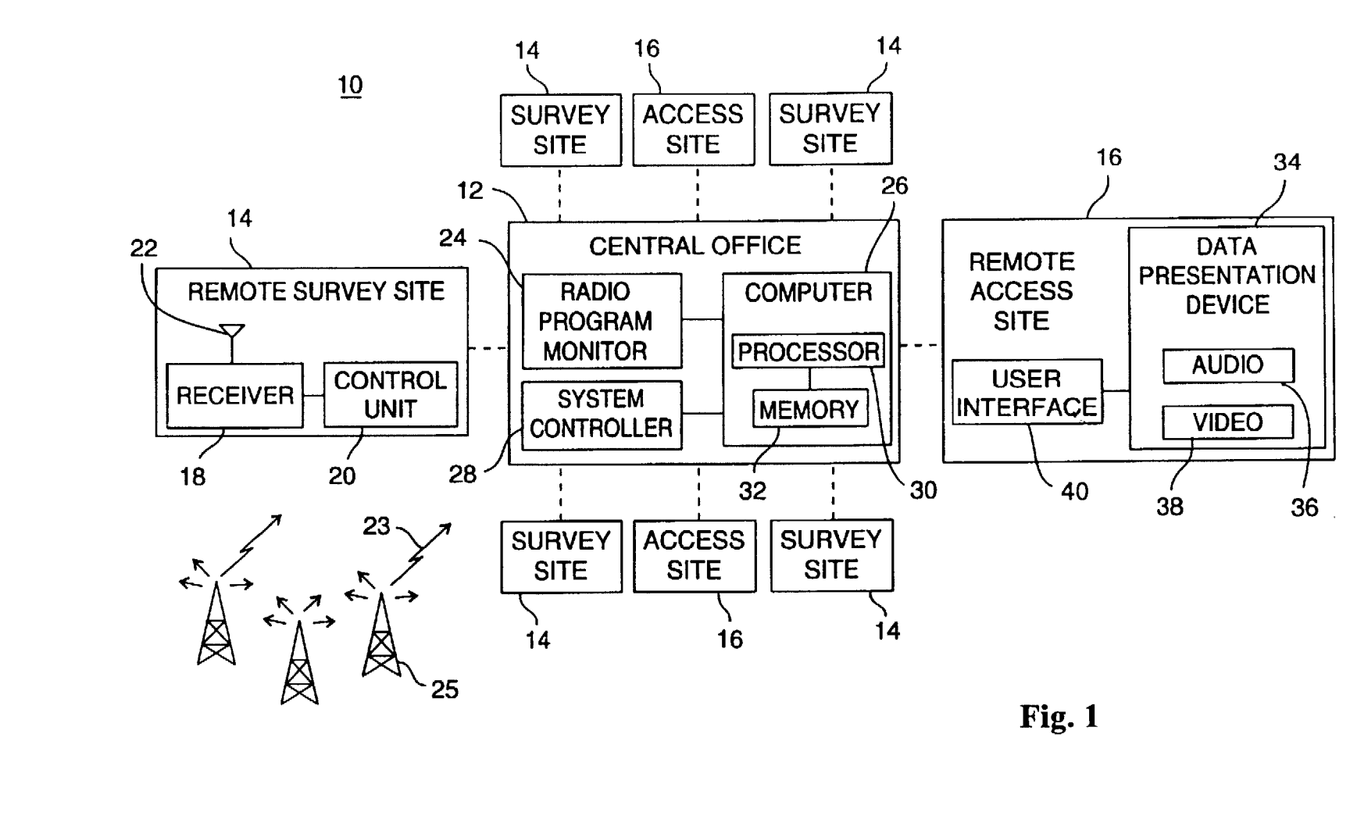
FIG. 1 is a block diagram representation of an audience survey system according to the present invention.

FIG. 1 illustrates an exemplary representation of an audience survey system 10 in accordance with the preferred embodiment of the present invention. In general, survey system 10 includes a central office 12, a multiplicity of remote survey sites 14, and a plurality of remote access sites 16. Survey sites 14 and access sites 16 are in data communication with central office 12. Survey sites 14 are distributed throughout a geographical area, such as a city, a county, a state, or the like. Although not a requirement of the present invention, survey system 10 may include an additional number of central offices (not shown) combined through a data communication network to support larger geographical areas. Although the preferred embodiment is shown and described as a system for estimating listening audience preferences in response to radio broadcast programming, the present invention may also be adapted for use as a system for estimating other characteristics representative of a population of vehicles. Thus, the present invention may be utilized with traffic control systems, car counting systems, and any number of systems that utilize vehicular survey data derived from the detection of radio tuner local oscillator emissions.

Survey sites 14 are each configured to passively collect survey data describing radio stations to which tuners are tuned. According to the preferred embodiment, survey sites 14 are located proximate a road or highway (not shown) to enable the electronic detection of vehicle radio usage. To enable the collection of a statistically relevant amount of data, a number of survey sites 14 are preferably located throughout a geographical area. For example, survey sites 14 may be located throughout many major metropolitan cities to collect survey data for nationwide or regional analyses. Alternatively, survey sites 14 may be densely located within a city to provide inter-city traffic or radio audience survey data. The parallel accumulation of data through many survey sites 14 enables survey system 10 to collect and process survey data for relatively short time intervals (several minutes or less).

Each survey site 14 includes a receiver 18 and a control unit 20. For clarity, standard operating components known to those skilled in this art are not shown or described herein. Radio tuners generate local oscillator (LO) signals for the demodulation of received radio signals, and a portion of each LO signal is emitted (rather weakly) from the tuners through the vehicle antennas. Thus, receiver 18 employs an RF antenna 22 to detect the LO signal emissions (which are associated with the transmitting radio station frequencies) from vehicles passing survey site 14.

Receiver 18 is calibrated with a site-specific LO detection threshold such that LO signals are selectively detected. In other words, many LO signals which otherwise have sufficient signal strengths to be detected by receiver 18 are ignored. The calibration of the threshold is controlled remotely by central office 12, and the threshold may be remotely adjusted from central office 12 (described below). The calibration procedure, receiver control functions, and other processes related to the present invention may be controlled by control unit 20. According to the preferred embodiment, survey data describing radio stations to which tuners are tuned may be accumulated or formatted at control unit 20 before being downloaded to central office 12.

Central office 12 functions as a processing center for survey system 10 and is preferably located at a remote location relative to survey sites 14. Central office 12 preferably controls the operation of survey sites 14, receives survey data from survey sites 14, and transmits processed survey data to access sites 16. Central office 12 includes a radio program monitor 24, a computer 26, and a system controller 28. Computer 26 includes at least a processor 30 and a memory 32. Again, for clarity, specific computer components well known to those skilled in the art are not shown in connection with computer 26. Processor 30 is configured to perform various operating processes described below and is connected to memory 32, which stores downloaded data from survey site 14 and programming instructions that define the various operating processes described herein.

Radio program monitor 24 is utilized to monitor a plurality of radio programs broadcast by a corresponding plurality of radio stations during the same time that the survey data is collected. FIG. 1 depicts radio programming 23 broadcast by transmitting antennas 25 corresponding to different radio stations. Radio program monitor 24 desirably time stamps and digitizes the radio programming for storage in memory 32 or for further processing by processor 30. According to the preferred embodiment, some or all of the radio stations in a city are concurrently monitored. Thus, survey system 10 is capable of producing a record of the radio programming broadcast by those stations during particular time periods.

System controller 28 may be a separate user interface or an integral part of computer 26. System controller 28 is preferably utilized to enable system operators to remotely control various processes described herein. For example, system controller 28 may allow an operator to remotely adjust the LO detection threshold utilized by survey sites 14 or to remotely instruct survey sites 14 to enter a calibration mode (described below).

Access sites 16 may be configured to facilitate online access to central office 12. According to the preferred embodiment, access sites 16 communicate with central office 12 through either cellular or wired telephone modems. The present invention may alternatively utilize any suitable remote data communication device. Thus, access sites 16 may be mobile, temporary, or permanent stations. Access sites 16 include a data presentation device 34 having an audio output 36 and a video output 38. Data presentation device 34 is preferably connected to a user interface 40. Data presentation device 34 may, for example, be a conventional personal computer having as much processing and memory capacity as needed. As such, audio output 36 may be implemented using a conventional personal computer sound card and speakers, and video output 38 may be implemented using a conventional video monitor. Data presentation device 34 is configured to provide an audio representation of radio programming while displaying a visual representation of the collected survey data. User interface 40 is preferably configured to enable an operator to interactively manipulate the audio or video data.

Figure 2:
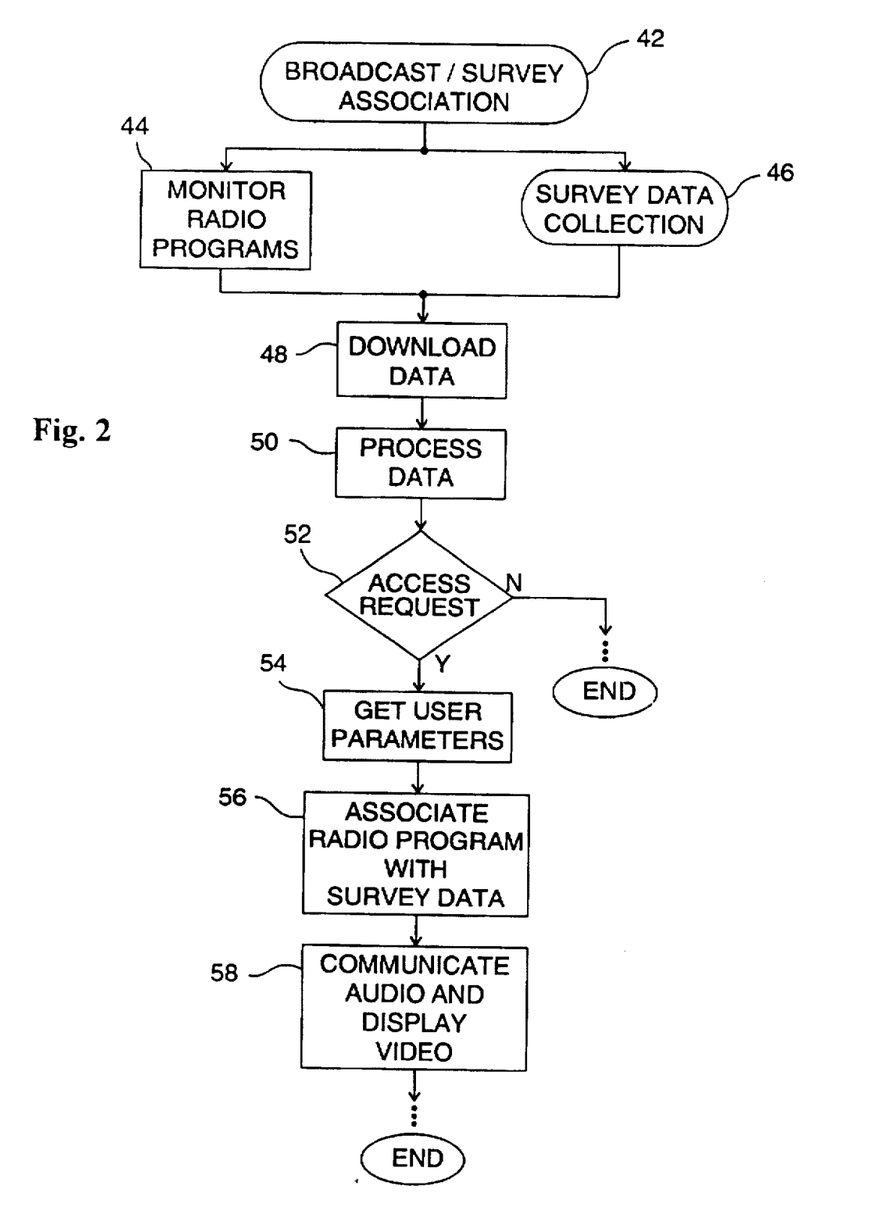
FIG. 2 is flow diagram of a broadcast/survey associating process performed by the audience survey system.

Referring now to FIG. 2, a broadcast/survey association process 42 performed by survey system 10 is depicted as a flow diagram. Process 42 preferably begins at the beginning of a time period during which survey data will be collected. For purposes of this description, "time periods" are used to conveniently describe the operation of process 42, and process 42 preferably does not operate with discrete blocks of time. In addition, a "radio program" may be any portion of a particular radio station broadcast and need not be a specific song, commercial, or other temporally defined segment. Furthermore, nothing prevents the preferred embodiment from continuously monitoring radio programming and continuously collecting survey data.

Process 42 begins by performing a task 44 and a procedure 46 substantially simultaneously. Task 44 monitors radio programming broadcast by a plurality of radio stations. The radio programming of each radio station may include any number of individual radio programs (such as songs, commercials, news briefs, and the like). Task 44 is performed by radio program monitor 24 (see FIG. 1). Using known techniques, task 44 may add time and date stamps while monitoring the radio programming and digitize the monitored radio programming for storage in memory 32. Survey system 10 eventually associates an audio representation of the monitored radio programming with a visual representation of the collected survey data. Because a high fidelity reproduction of the radio programming is not required by the present invention, task 44 need not fully record the radio programming. For example, task 44 may only sample the radio programming or digitize a limited bandwidth representation of the radio programming. In an alternate embodiment, task 44 may monitor the radio programming and associate an identification with the radio programming. While task 44 is being performed, procedure 46 collects survey data describing radio stations to which tuners are tuned during the time period. Procedure 46, which is performed at survey site 14, is described below.

Task 44 and procedure 46 eventually lead to a task 48. Task 48 downloads the survey data collected during procedure 46 from survey site 14 to central office 12. In addition, radio program monitor 24 may download corresponding radio programming data to computer 26 (see FIG. 1). Preferably, task 48 utilizes a telephone modem or other data communication techniques to download the survey data to central office 12. If desired, task 48 may be performed at substantially the same time as procedure 46 to achieve realtime data acquisition and processing. Alternatively, a short time delay may be implemented by survey system 10 such that survey data collected in the recent past is downloaded by task 48 while task 44 and procedure 46 continue to operate. Nothing prevents task 44 and procedure 46 from running continuously, while task 48 downloads data only when necessary. Survey system 10 may be configured such that survey sites 14 automatically place periodic downloading calls to central office 12 for downloading of survey data, or vice versa.

After task 48 downloads the survey data to central office 12, a task 50 processes and compiles the survey data according to specific system requirements. For example, task 50 may relate detected LO frequencies collected in the survey data to the corresponding transmitting frequencies and/or radio station call letters. Task 50 may also format the survey data by geographical location, time of day, or other categories. In addition, task 50 may process data related to other characteristics representative of the vehicles traveling within survey system 10, such as the average speed of the vehicles, the traffic density in specific areas, or the number of vehicles passing survey sites 14. Those skilled in this art will recognize that task 50 need not be performed at central office 12, e.g., task 50 may be performed at survey sites 14 before the survey data is downloaded or at other times during broadcast/survey association process 42.

After task 50, a query task 52 determines whether an access request is detected. The access request instructs survey system 10 to generate a report (not shown) containing formatted and compiled survey data. The access request may be input by any number of users located at access sites 16 or by a system operator at central office 12. Alternatively, the access request may be an internal parameter of survey system 10 that periodically prompts central office 12 to generate a survey report. If query task 52 determines that no access request is detected, then broadcast/survey association process 42 ends. Process 42 may exit into a standby mode or continue to monitor radio broadcasts and collect survey data. If query task 52 determines that an access request is detected, then a task 54 is initiated.

Task 54 gets a set of user parameters that describe how the survey data is to be formatted. According to the preferred embodiment, access site 16 is online with central office 12 during task 54. The user inputs his or her format preferences at access site 16, and central office 12 responds accordingly. For example, a user may control the time window subject to analysis, the radio programming segment to be heard, the radio station to be analyzed, and/or the selection of different demographic databases. Conventional data base manipulation techniques may be implemented by survey system 10 during task 54.

After task 54, a task 56 associates the specified radio programming with the survey data in a substantially synchronous format. For purposes of this description, "synchronous" refers to the time relationship between the radio program and the survey data. For example, if a radio station is to be analyzed for a time window between 1:00 PM and 2:00 PM on a given day, then task 56 associates the particular radio program with the portion of the survey data collected between 1:00 PM and 2:00 PM. Preferably, the radio program is associated chronologically with the portion of survey data, which may include periodic time stamps for synchronization purposes. Those skilled in the art will recognize that task 56 may alternatively be performed during tasks 48 and 50.

Following task 56, a task 58 is performed to present a survey report to the user. Specifically, task 58 communicates an audio representation of at least one radio program to access site 16 and displays a visual representation of the survey data at access site 16. Task 58 utilizes conventional data characterization and presentation techniques known to those skilled in the art. As a result of the synchronous association performed by task 56, the temporal relationship between the audio representation and the visual representation is substantially equivalent to the temporal relationship between the radio program and the survey data. Thus, a user at access site 16 hears information that allows the user to identify the radio programming while simultaneously viewing survey results for data collected when the radio programming was broadcast. In addition, the user preferably may change operational parameters such as the radio station being heard or the specific time window.

The preferred embodiment delays the presentation of survey results for less than approximately 24 hours. This time shifting allows the selected radio programming and survey data to be compressed in time to enable the user to quickly analyze the desired time window. However, nothing prevents the present invention from presenting the audio and visual representations in substantially real time to access site 16. Such real time processing may utilize a full time modem connection or other data transmission device between survey site 16 and central office 12 to facilitate immediate downloading of survey data.

According to the preferred embodiment, broadcast/survey association process 42 may be performed for relatively short time intervals. If the time resolution is reduced to approximately one minute or less, then the listening audience reaction to a particular song or commercial may be analyzed. Because survey system 10 preferably utilizes a multiplicity of survey sites 14 operating in parallel, a statistically significant amount of data may be gathered over a short period of time. Thus, survey system 10 is capable of providing data related to radio audience listening preferences on a song-by-song basis.

The specific format of the survey report, which is based upon the collected survey data, may vary from system to system. For example, the visual representation may be a graphical representation of the audience listening percentage for a particular radio station, the approximate number of listeners at a given time, a statistical comparison between two or more radio stations, and the like. Data presentation device 34 may also be configured to produce a printed survey report for a specific time period or a long term compilation of measured data.

Following task 58, broadcast/survey association process 42 ends. At this time, process 42 may allow the user to enter different parameters or alter the current visual display. Of course, if process 42 is continuously monitoring radio broadcasts and collecting survey data, then task 58 may exit into query task 52 to monitor for another survey request. It will be apparent to those skilled in the art that process 42 may be performed concurrently for a plurality of survey sites and/or a plurality of access sites.

Figure 3:
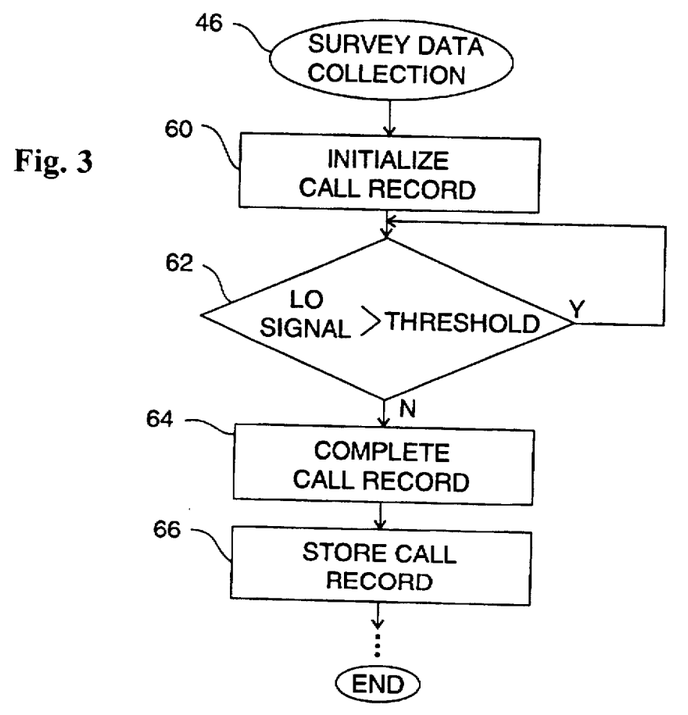
FIG. 3 is a flow diagram of a survey data collection procedure performed by the audience survey system.

Referring to FIG. 3, survey data collection procedure 46 is depicted as a flow diagram. As described above, procedure 46 is performed during broadcast/survey association process 42. Procedure 46 utilizes known RF electronic detection technology to detect LO signals emitted from tuners installed in vehicles passing survey sites 14. Procedure 46 may be repeated for a plurality of different LO frequencies corresponding to different radio station transmitting frequencies. Control unit 20 may be programmed with the specific LO frequencies corresponding to the local radio stations, or programmed to bypass certain frequencies that are exceptionally noisy or rarely tuned to. The data may be accumulated at control unit 20 for further processing or downloading to central office 12.

To minimize the collection of erroneous data, procedure 46 utilizes an LO detection threshold (described in detail below) such that relatively strong signals, corresponding to actual LO signals emitted from tuners, are detected. The LO detection threshold reduces the corruption of the survey data that may otherwise be caused by the unequal detection of low strength LO signals associated with radio stations located in different parts of the frequency band. Thus, procedure 46 is preferably performed upon the detection of a signal having a signal strength greater than the LO detection threshold.

Survey data collection procedure 46 begins with a task 60, which initializes a call record that contains data related to the received LO signal. The call record may include data such as the date, the survey site location, the detected LO frequency, the average signal strength, and a time stamp. Following task 60, a query task 62 tests whether the LO signal is still above the threshold strength. Procedure 46 repeats query task 62 until the LO signal falls below the threshold strength. When the detected LO signal falls below the threshold, a task 64 completes the call record by, for example, adding a final time stamp. After task 64, a task 66 stores the completed call record, preferably in control unit 20 (see FIG. 1). Following task 66, procedure 46 ends.

Figure 4:
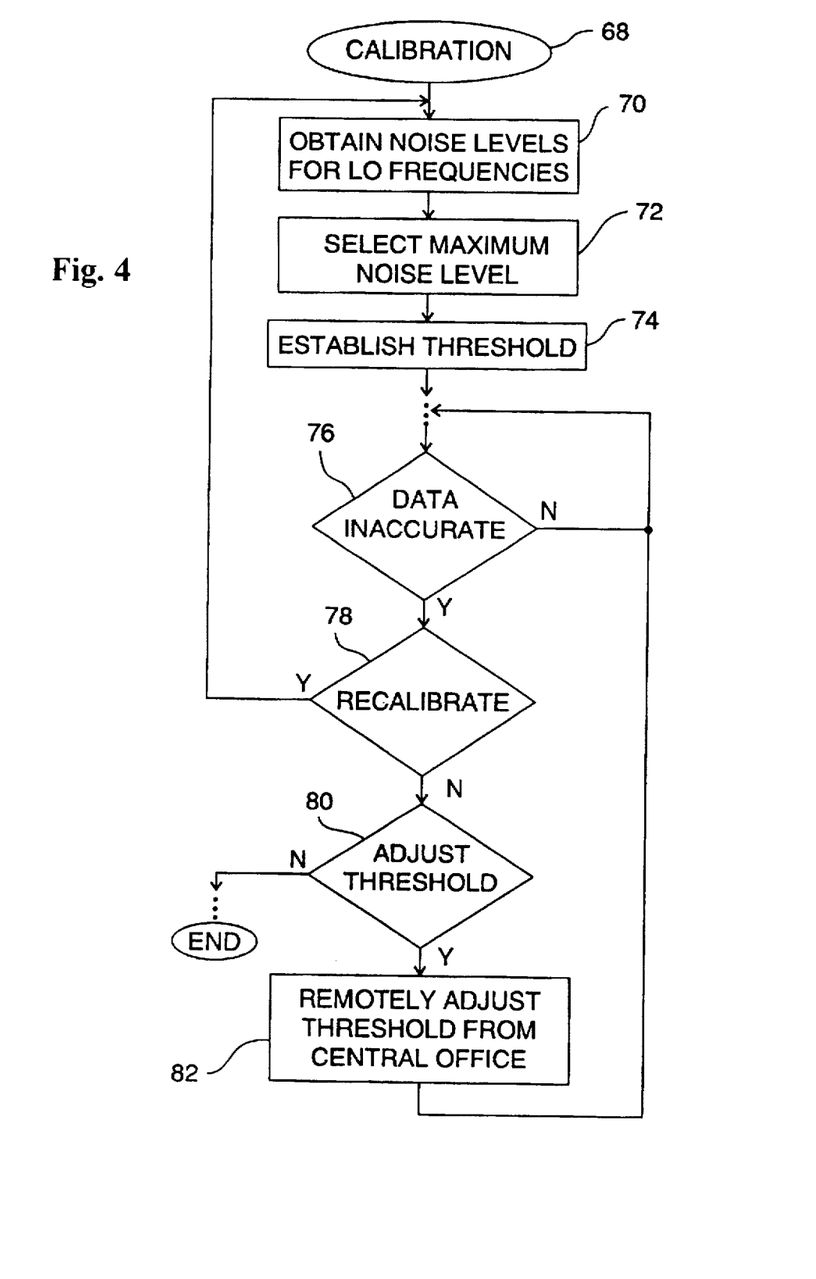
FIG. 4 is a flow diagram of a calibration process performed by the audience survey system.

As described above, a site-specific LO detection threshold is preferably utilized by each survey site 14. To establish the threshold values, a calibration process 68 is performed for each survey site 14. Process 68 is depicted in FIG. 4. Process 68 may, but need not, involve human interaction at central office 12. According to the preferred embodiment, process 68 is initiated by a remote command from central office 12. Such remote control is desirable when survey system 10 includes a multiplicity of individual survey sites 14, which may be widely distributed over a large geographical area. Those familiar with this technology should appreciate that manual calibration of survey sites 14 may be unreasonably time consuming and costly.

Calibration process 68 begins with a task 70, which obtains noise levels associated with the particular LO frequencies under analysis. Task 70 records any RF signals that are detected by receiver 18 during "quiet" times, i.e., when no tuner-generated LO signals are being detected at survey site 14. If an actual LO signal is detected, then task 70 ignores it for calibration purposes. Survey system 10 distinguishes actual LO signals from noise by comparing the signal strength levels, the variation of the signals over time, and/or other characteristics. Eventually, task 70 produces a noise level distribution over time for each LO frequency.

Following task 70, a task 72 is performed to select a maximum noise level associated with the noisiest one of the LO frequencies. Due to the operating environment, commercial radio channel spacing, and other factors, certain LO frequencies may be noisier than others. In addition, the noise level for a single frequency may vary with time. Calibration process 68 may perform task 70 for a continuous 24-hour period (or longer) to ensure that the noisiest LO frequency is identified at its noisiest time of day. Thus, task 72 analyzes the noise level distributions for each LO frequency to select the maximum noise level.

After task 72, a task 74 establishes the LO detection threshold such that it is greater than the maximum noise level selected by task 70. The LO detection threshold is established to ensure that LO signals are detected without statistically skewing the survey data. For example, if the threshold is set too low, then survey results may be skewed to favor noisy LO frequencies at the expense of other LO frequencies, whether or not actual tuner-generated LO signals are present. After task 74 is performed, calibration process 68 may be suspended (as indicated by the ellipses) as survey system 10 performs broadcast/survey association process 42. Thus, process 68 may be performed while process 42 is carried out during a normal operating mode.

Eventually, calibration process 68 prompts a query task 76, which tests whether previously collected survey data is substantially inaccurate. Query task 76 is preferably performed at central office 12. Query task 76 may be responsive to a system operator input at central office 12 or one of access sites 16. For example, the system operator may analyze raw or formatted survey data or observe a visual representation of the survey data. Using his or her know-how, the system operator may decide that the survey data contains aberrant or unrealistic data. Alternatively, computer 26 may include fault detection programming that periodically analyzes previously collected survey data to determine if it is erroneous or inaccurate. Inaccurate survey data may be indicated for any single survey site 14 if, for example, the average length of time that a particular LO frequency is detected is significantly longer than for other frequencies. As another example, if the average detected signal strength for a first frequency is significantly higher than the average detected signal strength for a second frequency at a given survey site 14, then the data for either the first or the second frequency may be inaccurate. If inaccurate data is detected for a particular frequency over a time period, then survey system 10 preferably discards all of the data collected from that particular survey site 14 during the time period to ensure that the survey results are not corrupted. Query task 76 may repeat while survey system 10 operates in a normal mode until it determines that previously collected survey data is inaccurate. When this occurs, a query task 78 is initiated.

Query task 78 determines whether the particular survey site 14 is to be recalibrated. As with query task 76, query task 78 may be responsive to either a human or a computer-generated decision. For example, survey system 10 may be subject to monthly or other periodic calibrations that are controlled from central office 12. Alternatively, if highly inaccurate data is being produced by a particular survey site 14, then recalibration may be necessary. If query task 78 determines that recalibration is necessary, then process 68 is reentered at task 70. If recalibration is not required, then a query task 80 may be performed. Query task 80 determines whether the current LO detection threshold is to be adjusted. This determination may, for example be based on the characteristics of the survey results. Alternatively, system operators may wish to analyze the effects of different threshold values. Again, query task 80 may be responsive to either a system operator command or a command from computer 26. If query task 80 determines that the current LO detection threshold is not to be adjusted, then calibration process 68 ends. Process 68 may exit at this time for further analysis of the inaccurate data or additional system maintenance.

If query task 80 determines that the current LO detection threshold is to be adjusted, then a task 82 is performed. Task 82 remotely adjusts the LO detection threshold from central office 12. This feature allows system operators to interactively calibrate survey sites 14 without physically having to travel to survey sites 14. After task 82 adjusts the threshold, calibration process 68 is suspended while survey system 10 operates normally. Thus, survey system 10 is preferably configured with an interactive and remotely operated calibration routine that facilitates the periodic maintenance of survey sites 14 via central office 12.

In summary, the preferred embodiment of the present invention provides an improved system for estimating listening audience preferences in response to radio broadcast programming. A relatively large quantity of survey data based upon vehicle radio usage may be collected in large or small geographical areas, which allows the system to detect radio audience preferences over relatively short time intervals. The preferred embodiment provides radio survey data synchronized in time with radio programs broadcast during the time period that the survey data is collected. In addition, the present invention is capable of generating and presenting survey results a short time after the raw survey data is collected.

The above description is of a preferred embodiment of the present invention, and the invention is not limited to the specific embodiment described and illustrated. For example, the specific hardware implementation of the described embodiment may be varied to achieve equivalent results. In addition, the specific tasks of the operating processes described herein need not be performed in any particular order, and the individual procedures are not restricted to particular operating components. Furthermore, many variations and modifications will be evident to those skilled in this art, and such variations and modifications are intended to be included within the spirit and scope of the invention, as expressed in the following claims.

What is claimed is:

1. A method for estimating listening audience preferences in response to radio broadcast programming, said method comprising the steps of:
   monitoring a radio program broadcast by a radio station during a time period;
   collecting survey data describing radio stations to which tuners are tuned during said time period;
   associating said radio program with said survey data in a substantially synchronous format;
   communicating an audio representation of said radio program to a remote access site; and
   displaying a visual representation of said survey data at said remote access site; wherein
   the temporal relationship between said audio representation and said visual representation is substantially equivalent to the temporal relationship between said radio program and said survey data.

2. A method according to claim 1, wherein:
   said collecting step occurs at a remote survey site in data communication with a central office;
   said method further comprises the step of downloading said survey data from said remote survey site to said central office; and
   said downloading step occurs after said collecting step.

3. A method according to claim 1, wherein:
   said monitoring step is performed for a plurality of radio program broadcast by a corresponding plurality of radio stations during said time period; and
   said associating step associates said plurality of radio programs with said survey data in a substantially synchronous format.

4. A method according to claim 1, wherein said collecting step is performed at a plurality of remote survey sites during said time period.

5. A method according to claim 1, wherein:
   said collecting step comprises the step of detecting local oscillator (LO) signals emitted from said tuners during said time period; and
   said detected LO signals are associated with said radio stations.

6. A method for estimating listening audience preferences in response to radio broadcast programming, said method comprising the steps of:
   monitoring a radio program broadcast by a radio station during a time period;
   collecting survey data describing radio stations to which tuners are tuned during said time period by detecting local oscillator (LO) signals emitted from said tuners during said time period, said detected LO signals being associated with said radio stations, and said collecting step being performed at a remote survey site in data communication with a central office;
   associating said radio program with said survey data in a substantially synchronous format; and
   calibrating, prior to said collecting step, an LO detection threshold for said remote survey site such that said LO signals are selectively detected, said calibrating step being controlled remotely by said central office.

7. A method according to claim 6, further comprising the steps of:
   determining when previously collected survey data is substantially inaccurate; and
   adjusting said LO detection threshold when said previously collected survey data is substantially inaccurate; wherein
   said adjusting step is controlled remotely by said central office; and
   said determining and adjusting steps occur before said monitoring step.

8. A method according to claim 6, wherein said calibrating step comprises the steps of:
   obtaining a noise level for each of a plurality of LO frequencies;
   selecting a maximum noise level from said obtained noise levels; and
   establishing said LO detection threshold such that it is greater than said maximum noise level.

9. A method for estimating characteristics representative of a population of vehicles in response to radio broadcast programming, said method comprising the steps of:
   establishing a multiplicity of remote survey sites, each of said remote survey sites being in data communication with a central office;
   passively collecting survey data describing radio stations to which tuners are tuned during a time period, said collecting step being performed at each of said remote survey sites by detecting local oscillator (LO) signals emitted from said tuners during said time period, said detected LO signals being associated with said radio stations;
   compiling said survey data at said central office, said compiling step occurring after said collecting step; and
   calibrating, for each of said remote survey sites, a site-specific LO detection threshold such that said LO signals are selectively detected, said calibrating step being performed before said collecting step, and said calibrating step being controlled remotely by said central office.

10. A method according to claim 9, further comprising the step of downloading said survey data from said remote survey sites to said central office, said downloading step occurring after said collecting step.

11. A method according to claim 9, further comprising the steps of:

determining when previously collected survey data from at least one of said remote survey sites is substantially inaccurate; and adjusting said site-specific LO detection threshold for said at least one remote survey site when said previously collected survey data is substantially inaccurate; wherein said adjusting step is controlled remotely by said central office; and said determining and adjusting steps occur before said collecting step.

12. A method according to claim 9, wherein, for each of said remote survey sites, said calibrating step comprises the steps of:

obtaining a noise level for each of a plurality of LO frequencies;

selecting a maximum noise level from said obtained noise levels; and establishing said site-specific LO detection threshold such that it is greater than said maximum noise level.

13. A method according to claim 9, further comprising the steps of:

monitoring a plurality of radio programs broadcast by a corresponding plurality of radio stations; and associating at least one of said radio programs with said survey data in a substantially synchronous format.

14. A method for estimating characteristics representative of a population of vehicles in response to radio broadcast programming, said method comprising the steps of:

establishing a multiplicity of remote survey sites, each of said remote survey sites being in data communication with a central office;

passively collecting survey data describing radio stations to which tuners are tuned during a time period, said collecting step being performed at each of said remote survey sites;

compiling said survey data at said central office, said compiling step occurring after said collecting step;

monitoring a plurality of radio programs broadcast by a corresponding plurality of radio stations;

associating at least one of said radio programs with said survey data in a substantially synchronous format;

communicating an audio representation of said at least one radio program to a remote access site; and displaying a visual representation of said survey data at said remote access site; wherein the temporal relationship between said audio representation and said visual representation is substantially equivalent to the temporal relationship between said at least one radio program and said survey data.

15. An audience survey system for estimating listening audience preferences in response to radio broadcast programming, said system comprising:

a central office;

a plurality of remote survey sites for collecting survey data describing radio stations to which tuners are tuned during a time period, each of said remote survey sites being in data communication with said central office;

means for monitoring a plurality of radio programs broadcast by a corresponding plurality of radio stations during said time period;

means for associating at least one of said radio programs with said survey data in a substantially synchronous format; and at least one remote access site having a data presentation device in data communication with said central office, said data presentation device being configured to communicate an audio representation of said at least one radio program and to display a visual representation of said survey data, wherein the temporal relationship between said audio representation and said visual representation is substantially equivalent to the temporal relationship between said at least one radio program and said survey data.

16. A system according to claim 15, wherein:

each of said remote survey sites comprises a receiver configured to detect local oscillator (LO) signals emitted from said tuners; and said detected LO signals are associated with said radio stations.

17. An audience survey system for estimating listening audience preferences in response to radio broadcast programming, said system comprising:

a central office;

a plurality of remote survey sites for collecting survey data describing radio stations to which tuners are tuned during a time period, each of said remote survey sites being in data communication with said central office, and each of said remote survey sites including a receiver configured to detect local oscillator (LO) signals emitted from said tuners, said detected LO signals being associated with said radio stations, and said receiver being calibrated with a site-specific LO detection threshold such that said LO signals are selectively detected and such that calibration of said site-specific LO detection threshold is controlled remotely by said central office;

means for monitoring a plurality of radio programs broadcast by a corresponding plurality of radio stations during said time period; and means for associating at least one of said radio programs with said survey data in a substantially synchronous format.

18. A system according to claim 17, further comprising:

means, located at said central office, for remotely adjusting said site-specific LO detection threshold associated with each of said remote survey sites.

* * * * *